United States Patent
Fischer

[15] 3,704,977
[45] Dec. 5, 1972

[54] APPARATUS FOR MAKING HOLLOW ARTICLES

[72] Inventor: Stefan Fischer, Im Korresgarten 21, Beruf:Fabrikant, Lohmar, Germany

[22] Filed: Oct. 6, 1970

[21] Appl. No.: 78,394

[30] Foreign Application Priority Data

Oct. 9, 1969   Germany.................P 19 50 911.6

[52] U.S. Cl..............................425/326, 425/242
[51] Int. Cl. ...........................................B29f 1/00
[58] Field of Search........18/5 BJ, 5 BP, 5 BA, 5 BM, 18/5 BE, 5 BN; 425/326 B, 246, 249

[56] References Cited

UNITED STATES PATENTS

| | | | |
|---|---|---|---|
| 2,853,736 | 9/1958 | Gassoni | 18/5 BJ |
| 2,913,762 | 11/1959 | Knowles | 18/5 BJ |
| 3,100,913 | 8/1963 | Matteo | 18/5 BJ X |
| 3,364,520 | 1/1968 | Hestehave | 18/5 BJ |
| 2,298,716 | 10/1942 | Moreland et al | 18/5 BJ UX |

Primary Examiner—Robert L. Spicer, Jr.
Attorney—Lilling & Siegel

[57] ABSTRACT

This invention relates to an apparatus for the production of hollow articles, especially bottles and the like, from thermoplastic synthetic plastic material, having an injection mould for the formation of a pre-moulding, a blow mould for the blowing of the pre-moulding into the finished hollow article and blow mandrels serving as transport device between injection mould and blow mould and usable as mould core of the injection mould, several of which mandrels are arranged on one common carrier which can be stepped further intermittently in the working sequence of the machine.

6 Claims, 2 Drawing Figures

PATENTED DEC 5 1972

3,704,977

INVENTOR
STEFAN FISCHER
BY
Lilling and Siegel
ATTORNEYS

APPARATUS FOR MAKING HOLLOW ARTICLES

RELATED U.S. APPLICATIONS

This application is related to applicant's co-pending U.S. patent applications identified respectively as U.S. Ser. No. 67,090 and U.S. Ser. No. 67,091 filed on Aug. 26, 1970.

BACKGROUND OF THE INVENTION

In such apparatus, the blow mandrels in many cases are arranged on one common hub which is rotatable about an axle by way of which not only the heating or cooling medium for the blow mandrels but also the blowing air must be supplied. Thus the supply and return conduits for the heating or cooling medium and at least one blowing air supply conduit are required. Thus appreciable difficulties in sealing occur at the transition points between axle and hub, since all conduits must be accommodated in a closely limited space.

These drawbacks and difficulties are to be eliminated by the invention. For this purpose, in an apparatus for the production of hollow articles, especially bottles, from thermoplastic synthetic plastic material having an injection mould for the formation of a pre-moulding, a blow mould for the blowing of the pre-moulding into the finished hollow article and blow mandrels serving as transport device between injection mould and blow mould and usable as mould core of the injection mould, several of which mandrels are arranged on one hub serving as common carrier which can be stepped forward intermittently in the working sequence of the machine, the invention provides that the blowing air supply conduit of each blow mandrel possesses an inlet opening lying on the outside of the hub, which opening when the mandrel is in the blowing position lies opposite to the mouth of a blowing air supply conduit and is connectable therewith. In this case the inlet openings of the blowing air conduits of the mandrels, which can be arranged equally on the periphery of the hub, are expediently fitted on one end of the hub.

In order to achieve a sufficiently tight connection between the inlet opening of the blowing air conduit and the blowing air supply conduit, the inlet opening can be provided with an inwardly tapered seating which at the same time serves to center the blowing air supply conduit, which can be pressed with its forward end against the seating and is expediently provided at its forward end with a tapered seal. The pressing of the blowing air supply conduit against the inlet opening of the blowing air conduit of the mandrel can be effected in a simple manner by a hydraulically or pneumatically controllable control cylinder, the control piston of which is seated on a piston rod formed as tube, to which the blowing air supply conduit is connected at the one end, while the other end is pressable against the seating of the inlet opening of the blowing air conduit.

BRIEF DESCRIPTION OF THE DRAWING:

The foregoing and other objects, features and advantages of the present invention will become more apparent from the detailed description hereinafter when considered in conjunction with the accompanying drawing wherein.

Figure 1:
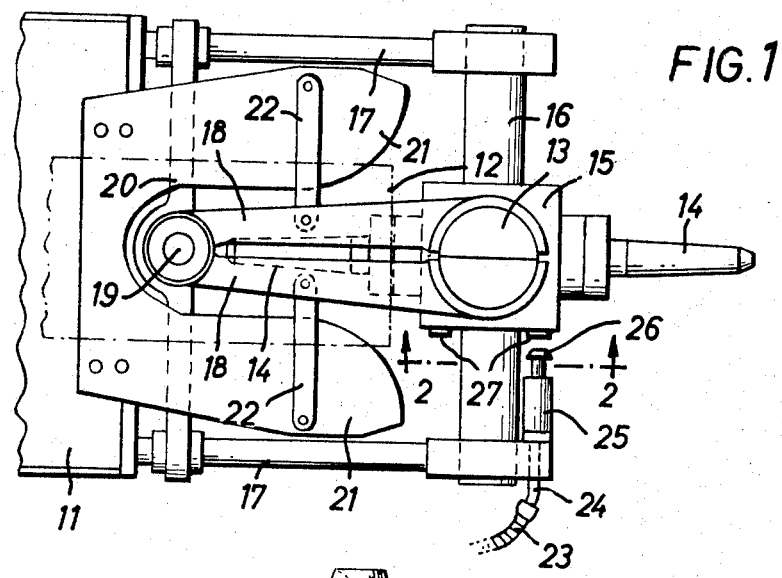
FIG. 1 shows a partial plan view of an apparatus for the production of hollow articles by the injection and blow-moulding method.
Figure 2:
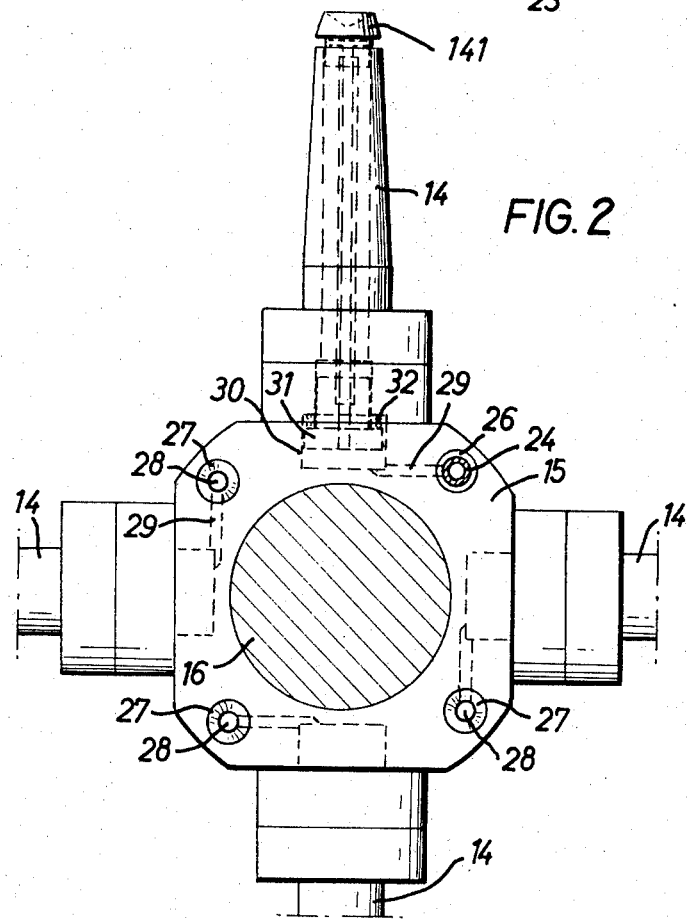
FIG. 2 shows a sectional view along the line 2—2 in FIG. 1.

DESCRIPTION OF THE PREFERRED EMBODIMENT:

In the drawing, the basis was adopted to an apparatus for the production of hollow articles in which a pre-moulding is formed with the aid of an extruder 11 and an injection mould 12, which is indicated in dot-and-dash lines in the drawing, which pre-moulding is blown in a two-part blow mould 13 to form the finished hollow article. The conveying of the pre-mouldings from the injection mould 12 into the blow mould 13 is effected by blow mandrels 14 of which four, offset by 90° in relation to each other, are arranged on one common hub 15 which can be stepped further through an angle of 90° in the working sequence of the machine. The hub 15 is mounted on an axle 16 which is carried by two spars 17 which are displaceably arranged in the machine frame of the extruder 11. By a displacement of the spars 17 the mandrel 14 situated in the injection mould 12 is removed with the formed pre-moulding from the mould, so that the hub can step further through 90°, in order to introduce the next blow mandrel into the injection mould 11 on return of the spars.

For the sake of completeness it should be noted that simultaneously with the removal of the injection pre-moulding from the mould the removal of the finished article from the blow mould 13 takes place, the opening and closing movements of which are likewise controlled by the spars 17, in that the blow mould halves are carried by two pivot arms 18 the common pivot spindle 19 of which is carried by a yoke 20 connected with the two spars 17, so that on a displacement of the pivot spindle 19 the opening and closing of the two halves of the mould 13 are effected through the links 22 connected on the one hand with the pivot arms 18 and on the other with a bracket 21 of the machine frame 11.

The supply of the blowing air to the blow mandrels 14 takes place through the blowing air supply conduit 23 which is connected to a pipe piece 24 which serves as piston rod of the control piston of a control cylinder 25. The pipe piece 24 is movable back and forth with the aid of the control piston in this way. Its mouth is provided with a tapered seal 26 which places itself against a tapered seating 27 on the end face of the hub 15 on forward pushing of the tube 24. This tapered seating 27 surrounds the inlet opening 28 of the air supply conduit 29 through which the blowing air is supplied to the blow mandrel 14, at the upper end of which it can flow out after lifting of the head 141.

The head 141 is lifted by the blowing air itself, which acts in a chamber 30 upon a piston 31 which is guided into the retracted position by return springs 32. The head 141 is rigidly connected with this piston 31. Inlet openings 28 are provided, offset in each case by 90° in relation to one another, on the end of the hub 15 so that in every position of the hub the connection with the pipe piece 24 can be constituted. In conclusion it should also be mentioned that naturally inlet and outlet conduits for a cooling or heating medium must also be provided in the blow mandrel 14, the hub 15 and the axle 16, which conduits however have not been illustrated for the sake of clarity of the illustration.

While the invention has been shown, illustrated, described and disclosed in terms of embodiments or modifications which it has assumed in practice, the scope of the invention should not be deemed to be limited by the precise embodiments or modifications herein shown, illustrated, described and disclosed, such other embodiments or modifications intended to be reserved especially as they fall within the scope of the claims here appended.

What is claimed is:

1. An apparatus for the production of hollow articles from thermoplastic synthetic plastic material, having an injection mould for the formation of a pre-moulding, a blow mould for the blowing of the pre-moulding into the finished hollow article and blow mandrels, each having a blowing air supply conduit, serving as transport device between said injection mould and said blow mould and usable as mould cores of the injection mould, several of which mandrels are arranged on a single rotatable hub disposed about a fixed spindle, said hub serving as common carrier which can be stepped further intermittently in the working sequence of the machine, said blowing air supply conduit of each blow mandrel possessing an inlet opening on the outside surface of the hub, which opening when the mandrel is in the blowing position lies opposite to the mouth of a blowing air supply conduit and is connectable therewith, whereby the difficulties in providing a seal between said rotatable hub and said spindle is avoided.

2. An apparatus according to claim 1, wherein said inlet openings of the blowing air conduits of said mandrels are provided on one end of said hub.

3. An apparatus according to claim 1, wherein said inlet opening of the blowing air conduit is provided with an inwardly tapered seating against which the forward end of the blowing air supply conduit can be pressed.

4. An apparatus according to claim 1, wherein the forward end of the blowing air supply conduit is provided with a tapered seal.

5. An apparatus according to claim 1, including a hydraulically or pneumatically controllable control cylinder and piston for pressing the supply conduit against said inlet opening of the blowing air conduit of said mandrel, the control piston of which is seated on a piston rod formed as tube, to which the blowing air supply conduit is connected at the one end, while the other end is pressable against the seating of said inlet opening of the blowing air conduits of said mandrels.

6. An apparatus according to claim 1, wherein the blowing air supply conduit of the blow mandrel opens into a chamber in which there is displaceable a piston raisable under the influence of the blowing pressure against the pressure of a return spring, and said piston is rigidly connected with the head of the blow mandrel for the lifting thereof.

* * * * *